United States Patent [19]

Mast

[11] 4,266,390
[45] May 12, 1981

[54] METHOD FOR COLLECTING AND RECYCLING CROP MATERIAL PARTICLES IN A ROLL FORMING MACHINE

[75] Inventor: Aquila D. Mast, Lancaster, Pa.

[73] Assignee: Sperry Corporation, New Holland, Pa.

[21] Appl. No.: 75,922

[22] Filed: Sep. 17, 1979

Related U.S. Application Data

[62] Division of Ser. No. 866,330, Jan. 3, 1978, Pat. No. 4,187,667.

[51] Int. Cl.³ ............................................. A01D 39/00
[52] U.S. Cl. ........................................... 56/1; 56/341; 56/DIG. 1
[58] Field of Search ................ 56/1, DIG. 2, 341-343

[56] References Cited

U.S. PATENT DOCUMENTS

| 3,680,296 | 8/1972 | Beebout | 56/1 |
|---|---|---|---|
| 3,976,084 | 8/1976 | Weber | 130/27 F |
| 4,035,999 | 7/1977 | Crane et al. | 56/1 |
| 4,106,268 | 8/1978 | White et al. | 56/1 |

*Primary Examiner*—Robert A. Hafer
*Attorney, Agent, or Firm*—Frank A. Seemar; James R. Bell; Larry W. Miller

[57] ABSTRACT

Apparatus in a crop roll forming machine for collecting particles of crop material lost from either the crop package or loose crop material during the roll formation process consisting of a collection pan, a horizontal collecting auger, an elevated delivery auger, intermeshing bevel gears, drive means and a discharge chute. The particles are recycled from the collection pan back into the roll forming region by the cooperative interaction of the horizontal collecting auger and the elevated delivery auger so that the crop material particles are directed out of the discharge chute and downwardly into the forwardmost portion of the bale forming region where the upper bale forming means works to include the particles in the crop roll being formed.

4 Claims, 2 Drawing Figures

METHOD FOR COLLECTING AND RECYCLING CROP MATERIAL PARTICLES IN A ROLL FORMING MACHINE

This is a Ser. No. 866,330, filed Jan. 3, 1978, now U.S. Pat. No. 4,187,667.

BACKGROUND OF THE INVENTION

This invention is concerned primarily with crop roll forming machines. Specifically it is concerned with apparatus which collect crop material particles lost from the crop package or loose crop material during the roll formation process and recycle those particles back into the roll forming region for inclusion within the completed roll package.

Historically, it has been the custom to harvest forage crops by mowing the crops, letting them dry in the field, forming the dried crop material into windrows and passing a hay baling machine over and along those windrows to form the crop material into rectangular bales. Recent practice has shown that the formation of crop materials into large compact rolls, rather than rectangular bales as formerly done, permitted the crop material to be deposited in roll form and left in fields for extended periods of time since the rolled material tends to provide a self-shedding protective covering from inclement weather. The ability to leave these rolled bales in fields thus obviated the additional steps of gathering the rectangular bales and transporting them to a storage area protected from the elements.

Several methods for forming compact rolls of crop material have evolved through the years. In one of these methods, a machine rolls a swath or windrow of crop material along the ground until a roll of desired size is obtained. Examples of machines utilizing this principle are shown in prior U.S. Pat. No. 3,110,145, dated Nov. 12, 1963. Another similar machine comprises the subject matter of prior U.S. Pat. No. 3,650,100 dated Mar. 21, 1972. One of the principle difficulties in using this method of forming rolls of crop material is that a certain amount of the material remains upon the group without being included in the roll. Furthermore, dirt, clods of earth, stones and the like can also be picked up by the roll and included therein. This is undesirable under certain circumstances.

A later, and more successful, method of forming crop rolls comprises a machine in which a swath or windrow of material is picked up from the field and directed onto a lower conveyor. This conveyor transports the material to a roll forming region where an upper apron or flight of belts, usually positioned above and adjacent the conveyor, moves in a suitable direction to rotate the crop material with which it contacts. The loss of crop particles from this type of machine has been a lingering concern. Variations of this type of crop roll forming machine are illustrated in U.S. Pat. No. 3,859,909 to Mast, dated Jan. 14, 1975, and U.S. Pat. No. 3,722,197 dated Mar. 27, 1973. An improvement of the former type of machine as shown in prior U.S. Pat. No. 3,866,531 to Todd, dated Feb. 18, 1975, attempted to solve this problem through the use of leaf springs.

The increasing popularity of crop roll forming machines has seen their use broaden from rolling wintering forage for livestock to rolling high protein crops, such as alfalfa, for dairy livestock where the amount of crop material loss is critical. In this latter area especially, interest in the amount of high nutrient crop material lost during roll formation has intensified.

The roll forming machines of the type taught in Todd with leaf springs have proven extremely effective in virtually all types of crops. However, regardless of the type of crop, some crop particles were always lost from the crop material package as it was being rotated. Other particles would be carried out the back of the machine by the lower conveyor or lower apron. Since there was no collection apparatus, these particles merely fell back onto the field and were lost.

The foregoing problem is solved in the design of the machine comprising the present invention by substantially decreasing the amount of crop material lost during the roll formation process.

SUMMARY OF THE INVENTION

It is the principle object of the present invention to provide an improved crop roll forming machine that will collect any type of crop material particles lost from the crop package or loose crop material during the roll formation process and recycle those particles back into the roll forming region for inclusion in the completed roll package.

It is another object of the present invention to provide an improved crop roll forming machine that will be able to operate in high protein brittle crops with minimum crop loss and still utilize a mechanically simple and reliable crop recycling system.

These and other objects and advantages are obtained by providing apparatus in a crop roll forming machine for collecting particles of crop material lost from either the crop package or loose crop material during the roll formation process comprising a collection pan, a horizontal collecting auger, an elevated delivery auger, intermeshing bevel gears, drive means and a discharge chute. The particles are recycled from the collection pan back into the roll forming region by the cooperative interaction of the horizontal collecting auger and the elevated delivery auger so that the crop material particles are directed out of the discharge chute and downwardly into the forwardmost portion of the bale forming region where the upper bale forming means works to include the particles in the crop roll being formed.

BRIEF DESCRIPTION OF THE DRAWINGS

The advantages of this invention will become apparent upon consideration of the following detailed disclosure of the invention, especially when it is taken in conjunction with the accompanying drawings wherein.

DETAILED DESCRIPTION

Figure 1:
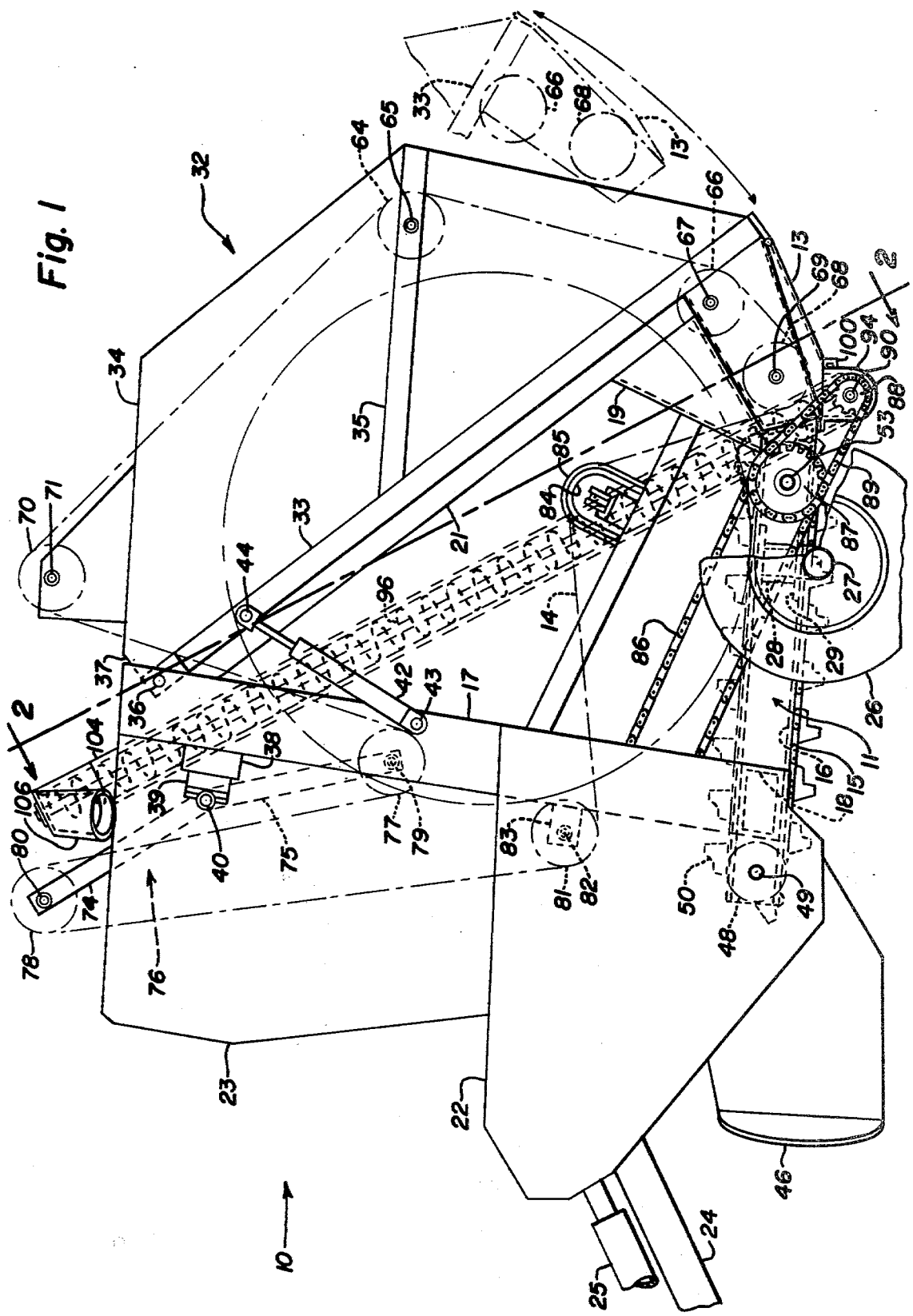
FIG. 1 is a partially diagrammatic side elevation of a roll forming machine illustrating the functional relationships of the intermeshing horizontal collecting and the elevated delivery augers, the collection pan, the discharge chute and the auger drive means.

Briefly, FIG. 1 depicts a general representation of the roll forming machine 10 with a cutaway of the elevated auger flighting 96, the bale forming means comprising the upper apron 14, and the conveying means comprising the lower apron 15. Machine 10 comprises a base frame 11 which has similar side arrangements of structural members fixedly connected together, such as by welding. Each side of the frame comprises a bottom horizontal member 16, with the forward end of the frame connected to a vertical member 17 of substantial height. Extending perpendicularly to the junction of members 16 and 17 is a cross member 18, the adjacent end of which is fixedly connected to the junction of member 16 to 17. A short member 19 extends upwardly from the rear portion of horizontal member 16, the upper end of this member being connected to one end of an upwardly and forwardly extending angular brace member 21. This angular brace member 21 is connected at its upper end to the upper portion of vertical member 17. Extending forwardly from the front face of member 17, but not shown, at each side of the machine is an A-frame consisting of angularly related members. These angular members are also not shown, being masked behind the side shield 22. Apron shields 23 are affixed to vertical member 17 above shield 22. Extending forwardly from this A-frame is a tractor hitch 24. Aligned along the same axis but above hitch 24 is drive shaft 25 attached at its forward end to a tractor power takeoff. The various frame members thusly described comprise the base frame 11, the towing hitch and drive shaft. They may be formed from heavy structural tubing, channels, or any other appropriate structural form commonly employed in framing of the type described.

Figure 2:
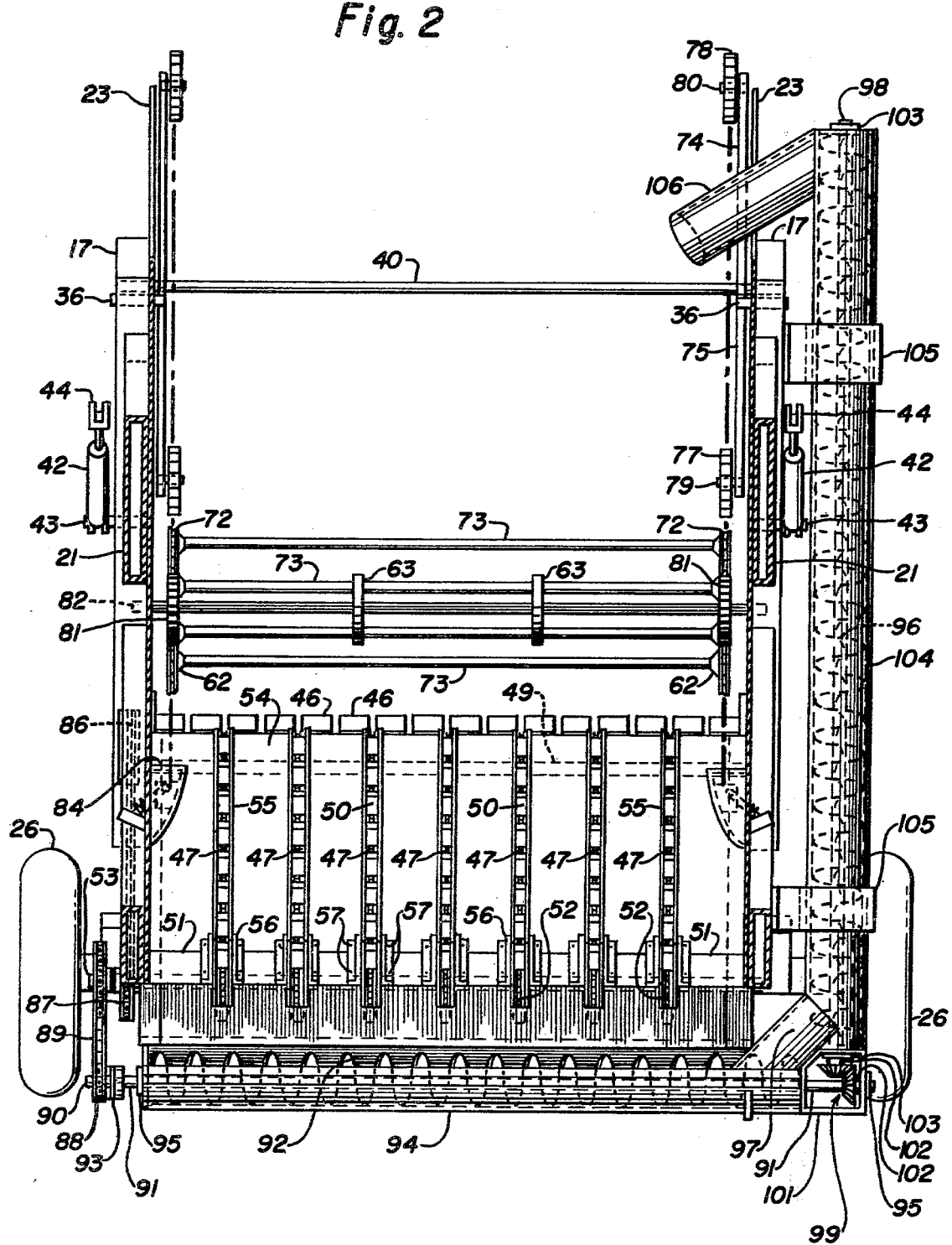
FIG. 2 is a sectional view of the augers, the lower apron and the floor in a roll forming machine taken along the section line 2—2 of FIG. 1.

The forward end of the machine in FIG. 1 has an appropriate gearbox, not shown, connected to suitable transverse supporting means and the angular members of the A-frame. The gearbox is driven by shaft 25 which is the primary source of operational power for the machine. A power output shaft (not shown) extends from the gearbox to one side of the machine as viewed in FIG. 1 to transfer power from the gearbox through a system of belted sheaves and drive sprockets to the operational elements. Lower apron drive chain 86 transfers power from a sprocket (not shown) mounted on the gearbox power output shaft (not shown) to the lower apron drive sprocket 87 of FIG. 2. The power is then transferred through shaft 53 to the lower apron driven sprockets 52, also mounted about shaft 53. Sprockets 52 then transfer the power to drive the flexible lower apron chains 47. Shaft 53, as shown in FIG. 1, has mounted at one of its extremities sprocket 87, which is connected to horizontal auger sprocket 88 by the horizontal auger drive chain 89. Auger sprocket 88 is mounted about stub shaft 90. As best seen in FIG. 2, shaft 91 spans the width of the roll forming machine 10 and has the horizontal auger flighting 92 affixed to substantially its entire length. Shaft 91 has mounted interiorly of horizontal auger sprocket 88 a slip clutch 93 which selectively journals stub shaft 90 and shaft 91. The horizontal auger flighting 92 is contained within collecting trough 94, which is located at the rear of and slightly below floor 54 adjacent to angled cover plate 51. Horizontal auger journals 95 are placed on shaft 91 outside the end walls of collecting trough 94. Collecting trough 94 is reinforced by cross brace 100, best seen in FIG. 1, by welding, bolting or the like.

Collecting trough 94 is connected to elevated auger housing 104 by transition chute 97 as seen in FIG. 2. Horizontal auger shaft 91 is connected to elevated auger shaft 98 by a pair of intermeshing bevel gears 99. The bevel gears 99 are contained in gear housing box 101. The gears 99 have spacing washers 102 mounted on each of their shafts. Elevated auger shaft 98 has a journal 103 at each of its extremities. Elevated auger shaft 98 and elevated auger flighting 96 are contained within elevated auger housing 104. Housing 104 is securely mounted to the roll forming machine 10 by mounting brackets 105. Discharge chute 106 is attached to the upper end of elevated auger housing 104 in any suitable fashion, such as welding, and at such an angle as to permit the crop particles recycled from the collecting trough 94 to be discharged back into the forwardmost portion of the roll forming region between the upper apron 14 and the lower aprong 15.

An upper frame 32 is provided with side frames composed of straight frame members 33, the ends of which are connected to the opposite ends of an encasing frame member 34. A horizontal upper frame member 35 is fixedly fastened to frame member 33 and encasing frame member 34 at its opposing ends. The uppermost portion of each side frame member is pivotally connected at 36 to a suitable bearing fixed to the upper end of vertical frame member 17. Frame member 37 extends between the upper ends of straight frame member 33, thereby stabilizing the connection to the base frame 11 of the upper frame 32 at pivotal connections 36. The upper end of base frame 11 is further stabilized transversely by a bracing member 38 which extends between bearing brackets 39 which are connected to the front faces of the vertical frame members 17.

Upper frame 32 is moved from its lower, bale forming position as shown in FIG. 1 to its extended bale discharge position, not shown, by a pair of hydraulic cylinders 42. These hydraulic cylinders have their barrel ends 43 connected to vertical members 17 and their rod ends 44 connected to members 33 of upper frame 32. Suitable hydraulic lines, not shown are connected to opposite ends of cylinders 42 to simultaneously activate and control the operation of the upper frame.

The base frame 11 has a pair of wheels 26 connected thereto on opposite sides of the frame by an axle 27, reinforced by transverse beam 28 and support plates 29, to permit the roll forming machine to be drawn by a tractor or other suitable implement over a field for the purpose of forming rolls of crop material.

Extending forwardly from the front end of the base frame 11 is a pickup header 46, still referring to FIG. 1. This header is adapted to engage, elevate and rearwardly feed a swath or windrow of crop material onto the roll forming machine. The material engaged by the header passes rearwardly from the entrance end of lower apron 15 towards the rear of the machine. The lower apron 15 comprises a conveying means having a series of endless, flexible chains 47, see briefly FIG. 2, which are uniformly spaced transversely across the plane generally defined by the floor 54 of, the roll forming machine. These endless, flexible chains 47 extend around driven sprockets 48 rotatably mounted on shaft 49 at the forward end of roll forming machine. The chains 47 also pass around lower apron driven sprockets 52 rotatably mounted at the rear of the machine about shaft 53. Mounted above the horizontal member 16 of base frame 11 is the floor 54, shown primarily in FIG. 2. Mounted to the floor by bolts (not shown) partially encasing sprockets 52 is an angled cover plate 51 through which the chains 47 pass as they travel around sprockets 52. An angled bottom plate (not shown) is fastened to the bottom of horizontal member 16 in any suitable fashion, such as welding or bolting, to completely enclose the rear floor area. The floor 54 is rigidly connected to frame 11 by a series of extending bars (not shown), the opposite ends of which are suitably connected to horizontal member 16 of base frame 11 to support the floor in a generally horizontal position. The upper courses of chains 47 slide in channels 55 on floor 54, as shown in FIG. 2. These channels are transversely spaced apart and suitably secured to floor 54 to support and guide the chains across the floor of the machine. The links of chains 47 have lugs 50 connected thereto. Adjacent each side of these channels 55 is a chain stripper plate 56 mounted to the angled cover plate 51 by adjustable fasteners 57 at the plate's front and rear ends. The upper courses of the chains 47 move in a direction toward the rear of the roll forming machine, so that the lugs 50 engage and direct crop material rearwardly across the floor portion of the machine.

The rear end of floor 54 abuts tailgate 13 when the tailgate is in the closed, bale forming position, as shown in FIG. 1. The phantom depiction of tailgate 13 partially illustrates the path of the tailgate 13 as the upper frame 32 is raised to the bale ejecting position. An adjustable plate (not shown) can be affixed to either the bottom portion of tailgate 13 or to the lowest portion of angled cover plate 51 to redress any inconsequential misalignments caused by manufacturing imprecisions to permit contiguous engagement of the lower tailgate and cover plate 51 when the tailgate is in the closed, bale forming position.

The upper apron 14 preferably comprises a pair of endless flexible link type chains 72 having, at longitudinally spaced intervals, bars 73 which extend between these chains the full width of the machine. The bars 73 may be square or of any other suitable geometric shape. These bars 73 are fastened by bolts (not shown) to the individual links of chain 72 of upper apron 14 by mounting brackets 62 as shown in FIG. 2.

The upper apron 14, as shown in FIG. 1, is supported and driven by various rollers and sprockets at each side of the upper frame 32. Guide rollers 64 and 66 are mounted about shafts 65 and 67 on opposing sides of the middle and lower portions of upper frame 32. Guide sprockets 68 and 70, respectively, are supported by clevises (not shown) which are connected to the opposite ends of the encasing frame member 34. Sprockets 68 and 70 are mounted about shafts 69 and 71 respectively. Extending from the ends of shaft 40, which is supported in bearing brackets 39 adjacent the upper end of vertical frame member 17, are two pair of parallel arms 74 and 75. These arms comprise the expansion means 76 for the upper apron 14. The ends of these arms support rotatable guide sprockets 77 and 78 upon which the endless chains of upper apron 14 extend in the manner shown in FIG. 1. Sprockets 77 and 78, respectively are mounted about shafts 79 and 80. A tensioning means, not shown, operates to maintain the upper apron in contact with the roll of crop material as it is being formed so that a particular density of material can be obtained. Driving sprockets 81 are provided at each side of the base frame and are connected to a driven shaft 82 that is supported in bearing brackets 83 fixed relative to the base frame 11. Mounted intermediately about shaft 82 is a pair of spaced guide rollers 63, best shown in FIG. 2. Each side of the lower course of the upper apron 14 also slidably extends over the upper curved surface of retractably mounted auxiliary guide members 84, of the type described in detail in prior U.S. Pat. No. 3,815,345 dated June 11, 1974, to Mast. These auxiliary guide members 84 are spring loaded and are adapted to be retracted into accommodating spaces in the side plates of the machine so as not to interfere with the ends of the roll of material as the roll is being formed. Therefore, as the roll increases in diameter the auxiliary guide plates 84 will be pushed through openings 85 so as not to interfere with the ends of the roll as the roll increases in diameter.

In operation, as the roll forming machine is drawn over a field its pickup header 46 retrieves a swath or windrow of crop material from the field, elevating and transporting this material onto the floor 54 of the roll forming machine. This material is placed on the floor where the lugs 50 mounted on the flexible chains 47 transport the material from the front portion of the floor towards the rear. Thus, a continuous stream of crop material is delivered to the floor of the machine and then is directed to the rearmost portion of this floor where it contacts the upper apron 14. The upper apron is rotating in a suitable direction, in combination with the direction of rotation of the lower apron chains 47, to cause the crop material to be rotated so as to form the material into a roll. The tailgate 13 permits the guide sprockets 68 to be positioned close to the ground and, hence, the crop material to be easily started in rotative motion.

This procedure is continued, progressively increasing the diameter of the roll of material. During this roll forming cycle particles of crop material are lost either as the rolled crop material package is being formed or from the loose crop material being transported by the lower apron. The vast majority of these crop particles are lost at the rear of the cover plate 51. Prior roll forming machines permitted some of these lost crop particles to escape through the slit formed by the junction of the rear end of the cover plate 51 and the bottom portion of the upper frame 32. Concurrently these crop particles would accumulate in the bottom of upper frame 32 until the crop roll was full sized and ready for ejection from the machine. At such times the upper frame 32 would be raised by the hydraulic cylinders 42 to allow the roll of crop material to be discharged from the rear of the machine. However, raising upper frame 32 would also cause the lost crop particles to be dumped from the upper frame onto the ground. The machine in the present invention directs these lost particles into a collecting trough 94 formed at the rear of the floor 54 and actively returns them to the bale forming region formed between the upper and lower aprons by the cooperative functioning of the horizontal and elevated auger flightings 92 and 96 respectively. This is effected by the collection and transfer of these crop particles by the horizontal auger 92 through the transition chute 97 to the elevated auger 96. The elevated auger 96 then delivers the particles upwardly to the discharge chute 106 where they are directed downwardly into the forwardmost portion of the bale forming region. There the upper apron 14 works to include the particles in the crop roll being formed. Slip clutch 93 permits the horizontal auger sprocket 88 to turn freely should either of the horizontal or the vertical auger flightings, 92 and 96 respectively, become jammed by an obstruction during operation.

When the roll of crop material is finally formed and it is desired to discharge the formed roll from the machine, upper frame 32 is elevated through the use of hydraulic cylinders 42 and the lugs 50 mounted on the chains 47 of the lower apron positively engage the bottom-most portion of the rolled crop material. This causes the roll of material to be moved rearwardly until it is urged off the roll forming machine. Once the bale has cleared the machine the upper frame 32 is lowered into the bale forming position, shown in FIG. 1.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangement of parts which will occur to one of skill in the art upon a reading of this disclosure.

Having thus described the invention, what is claimed is:

1. The method of recycling crop material particles back into the roll forming region of a mobile crop roll forming machine during the roll forming process, comprising the steps of:
   (a) towing the roll forming machine across a field of crop material to pick up crop material from the ground and form said crop material into a roll;
   (b) collecting the particles of crop material lost from the roll during the roll forming process at a collection location within the roll forming machine before said lost particles come into contact with the ground;
   (c) transporting the collected crop material particles from the collection location along a predetermined path; and
   (d) depositing the transported crop material particles in the roll forming region for inclusion in the roll of crop material.

2. The method according to claim 1 wherein the method further comprises the steps of:
   (a) wrapping the crop material package with a binding means; and
   (b) discharging the wrapped crop material package from the roll forming machine.

3. The method of recycling crop material particles back into the roll forming region of a mobile crop roll forming machine during the roll forming process, comprising the steps of:
   (a) propelling the roll forming machine across a field of crop material to pick up crop material from the ground and form said crop material into a roll;
   (b) collecting the crop material particles lost from the roll forming region during the roll forming process at a collection location within the roll forming machine before said lost particles become deposited upon the ground;
   (c) transporting the collected crop material particles from the collection location along a predetermined path; and
   (d) depositing the crop material particles in the roll forming region for inclusion in the rolled crop material package.

4. The method according to claim 3 wherein the method further comprises the steps of:
   (a) wrapping the crop material package with a binding means; and
   (b) discharging the wrapped crop material package from the roll forming region.

* * * * *